United States Patent [19]
Shelton et al.

[11] 3,966,042
[45] June 29, 1976

[54] FASTENER STRIP

[75] Inventors: Lawrence S. Shelton, Morton Grove; Rudolf A. M. Golsch, Mount Prospect; Dieter G. Boigk, Skokie, all of Ill.

[73] Assignee: Signode Corporation, Glenview, Ill.

[22] Filed: July 7, 1975

[21] Appl. No.: 593,538

Related U.S. Application Data

[63] Continuation-in-part of Ser. No. 354,313, April 25, 1973, abandoned.

[52] U.S. Cl. .............................. 206/344; 206/338; 227/136; 206/813
[51] Int. Cl.² ....................................... B65D 85/24
[58] Field of Search .................. 206/338, 343–346, 206/443, 813; 227/136; 85/18

[56] References Cited
UNITED STATES PATENTS

| | | | |
|---|---|---|---|
| 2,379,934 | 7/1945 | Seiferth............................ | 206/443 X |
| 3,152,334 | 10/1964 | Lingle .............................. | 206/344 |
| 3,276,576 | 10/1966 | Langas et al..................... | 206/345 X |
| 3,357,761 | 12/1967 | Langas et al..................... | 206/345 X |
| 3,463,304 | 8/1969 | Gallee et al...................... | 206/347 X |
| 3,515,271 | 6/1970 | Bader................................ | 206/344 |
| 3,625,352 | 12/1971 | Perkins ............................ | 206/344 |
| 3,756,391 | 9/1973 | Keck et al........................ | 206/343 |

*Primary Examiner*—Steven E. Lipman
*Attorney, Agent, or Firm*—Dressler, Goldsmith, Clement & Gordon, Ltd.

[57] ABSTRACT

A strip of nails for use in a rapid-acting driving apparatus which includes a plurality of nails with shanks in a side-by-side closely spaced parallel array. The shanks of each of the nails in the array are secured together by a carrier of a single-component, metal-adherent plastic defining uniform envelopes for opposed sections of the periphery of each nail shank. Within the gaps between the shanks, adjacent envelopes form opposed spaced generally V-shaped folds which act as sites for easy shearing of a nail from the strip. The bond between the plastic and the nail shank is greater than the shear resistance of the carrier material between two adjacent fasteners and greater than the resistance of the workpiece encountered when fastener and carrier material penetrate the same, with the result that all the material that holds the fastener together enters the workpiece.

10 Claims, 8 Drawing Figures

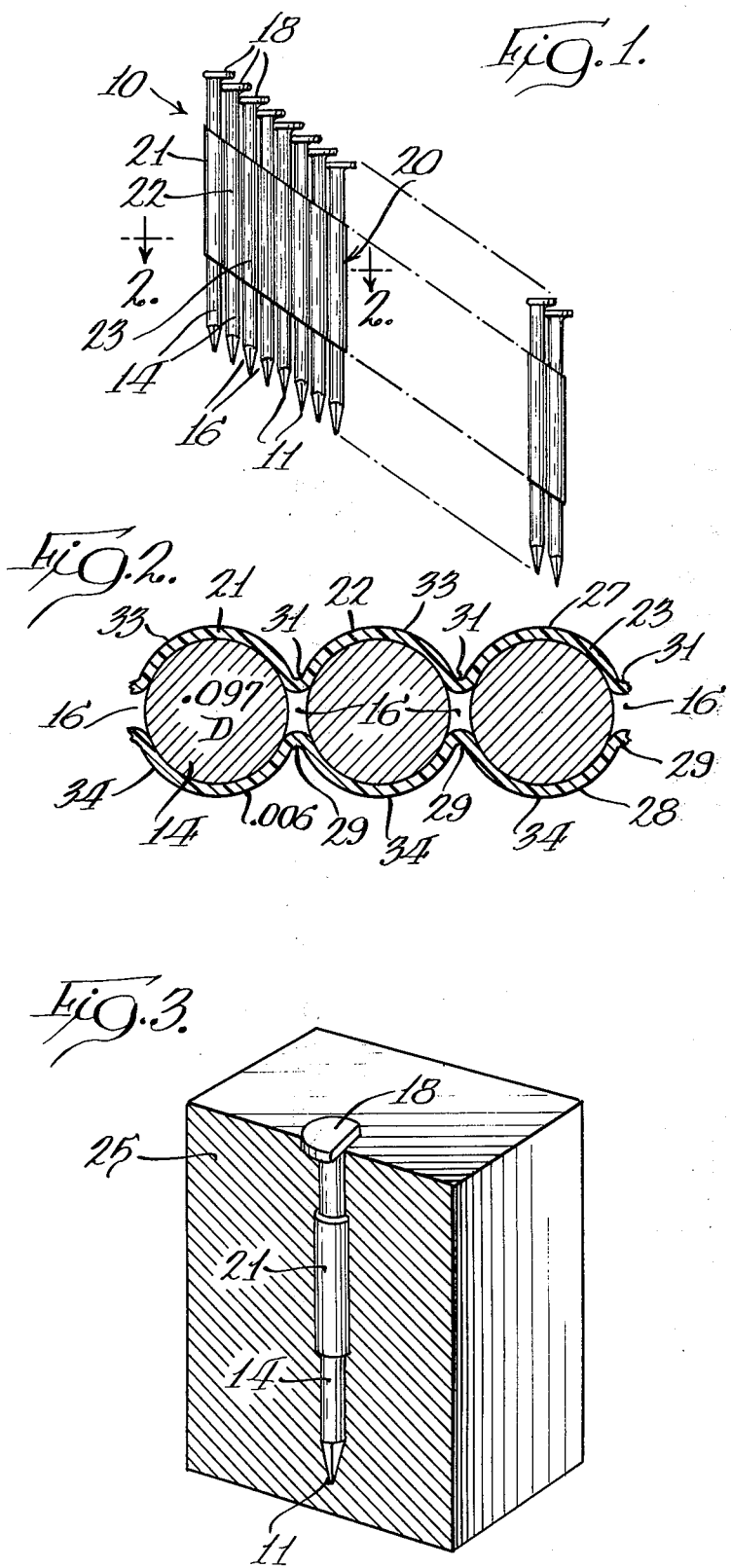

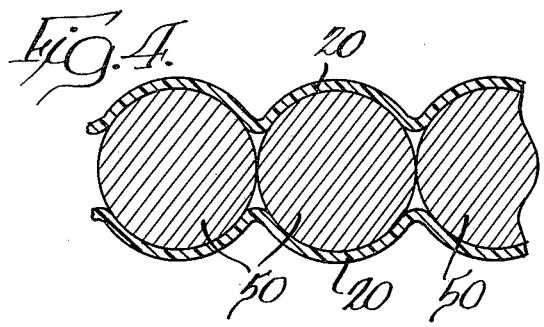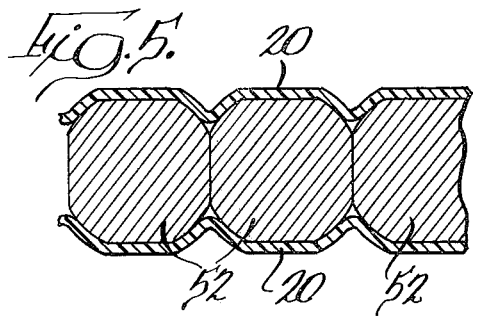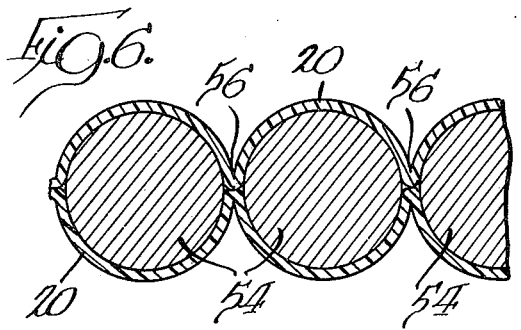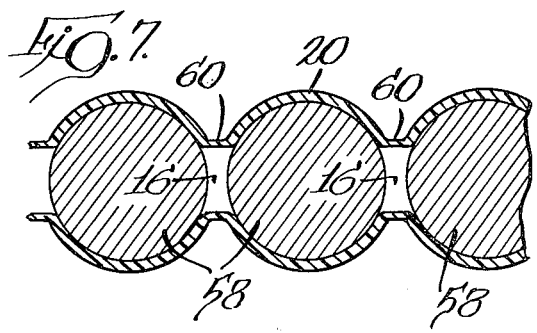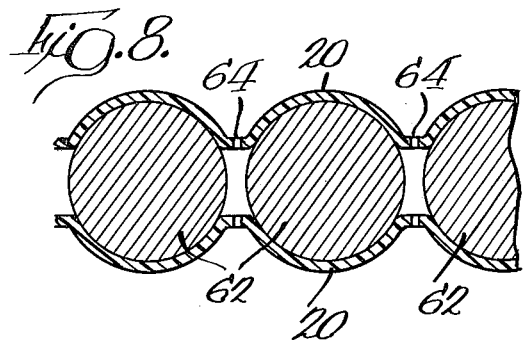

FASTENER STRIP

This application is a continuation-in-part of application Serial No. 354,313, filed Apr. 25, 1973, now abandoned.

BACKGROUND OF THE INVENTION

This invention relates to fasteners such as nails, and the like, secured in strips for use in rapid-acting fastener driving tools.

Strips of nails and fasteners of similar types having elongated shanks joined together at the shanks by various expedients, such as wire, paper, and adhesives, or plastics, have come to be heavily used in connection with fastener driving tools to provide easy handling and loading and fast application to work. Such nail strips, and the driving tools in which they are used, have proved quite satisfactory in terms of speed and convenience.

However, with continuously increasing heavy usage, a growing need has arisen for more improvement in reliability, safety, ease of handling, etc., than is available by existing fastener strips. Existing disadvantages of the strips on the market include the breaking up of the carrier materials holding the fasteners together to produce particles upon the driving of a fastener which may stay inside the driving apparatus and increase the tendency of the apparatus to jam. Also, some carrier materials tend to shear away from the driven fastener at high velocities under the driving force of the fastener tool, with the result that particles are sprayed around, an obvious disadvantage from a safety standpoint.

Even when such barrier material has not been propelled from the tool, or has not become lodged inside to cause jamming, the separation of carrier material usually accompanying the use of prior art nail strips has given rise to equally undesirable accumulations of unsightly and often slippery debris about the work area. Also, carrier debris has tended to collect under the heads of nails and like fasteners, giving rise to both safety and finishing problems.

Essentially, a large number of carrier strips have been proposed, without complete success, to meet the following objectives, which are necessary in order to meet the strict demands of the relevant industries. These include the requirement that the strip be strong enough to be shipped, handled by the tool operators, and not destroyed inside the magazine while separation from the strip takes place. Each fastener and associated carrier material must be connected together and have a predetermined breaking point from the rest of the fasteners such that a single fastener with carrier material will be separated from the remaining strip and when driven will be carried along with the fastener and will leave no residue or carrier material on the working surface, exteriorly of the workpiece, or under the fastener head, after the fastener has been driven into soft and hard woods. The carrier must remain connected to the fastener during driving so that it does not clog the tool, thus causing malfunction of the tool, or be a potential source of injury to the tool operator, or a bystander by expelling debris from the tool. Furthermore, the strip must be economical to manufacture and be insensitive in performance to temperatures ranging from −10°F. to 160°F.

The prior art developments can be divided into two generalized catagories, hereinafter referred to as (a) single-component carriers and (b) two- or more-component carriers.

Single-component carriers are such as plastic materials extruded around fasteners, which plastic materials securely hold the fasteners in position. The strips are usually strong, rigid, economical to manufacture, and insensitive to elevated operating temperatures. However, at lower temperatures, these materials become extremely brittle, and the carrier breaks up when advanced inside the magazine. This results in carrier debris being expelled from the tool after the nail has been severed from the strip and the carrier breaks up into random pieces. Furthermore, with the frictional relationship between the fastener and carrier, the plastic breaks away from the nail during driving and does not enter the workpiece, which would prevent the debris scattering referred to above and the jamming of the tool resulting from loose pieces of carrier material in the driving chamber. Patents disclosing this type of nail strip is typified by U.S. Pat. Nos. 3,463,304 and 3,756,391. Some of the aforementioned deficiencies have been overcome by using wire as a carrier material, which is welded or staked to the nail. While such an approach overcomes the temperature problems and reduces the amount of debris, it increases the safety risk tremendously, because any small portion of wire breaking loose potentially leaves the tool like an uncontrolled projectile.

The typical two-component carrier material uses an adhesive of some sort to form an integral unit of fasteners and carrier with a general reduction in the amount of flying debris, which therefore minimizes jamming and increases the safety aspect. However, these adhesives have several disadvantages, including (1) they are by nature stickier, gummier and stick to the tools, which requires services work; (2) they do not have sufficient peel and/or shear strength to overcome the drive resistance of lumber; and (3) the acceptable adhesives fail to meet the total operating temperature range. By not having the desired peel and/or shear strength, the adhesive carrier will be shaved off the fastener when it enters the lumber and will be deposited under the fastener head and protrude therefrom, or remnants will be left on the workpiece. In the case of adhesives being used, since they are not able to operate during the total range of operating temperatures, it is necessary to utilize different adhesives under different temperature conditions, which has obvious disadvantages and causes double inventories and complicated and unreliable performance. Typical of this type of nail strip are those disclosed in U.S. Pat. Nos. 3,276,576, 3,515,271, and 3,625,352.

SUMMARY OF THE INVENTION

In accordance with the present invention, a strip of fasteners is provided for use in rapid-acting fastener driving tools which utilizes a single-component carrier material, but obviates the problems caused by separation of carrier material. The strip in question includes a plurality of metal fasteners having elongated cylindrical shanks disposed in close parallel relationship.

The fasteners are secured together in this relationship by carrier means for connecting the fasteners to form the strip with such means including a plurality of metal-adherent plastic envelopes of generally uniform thickness for each of the shanks. Each of such envelopes includes a pair of opposed portions adhering respectively to opposed sections of the periphery of each shank between adjacent gaps and extending at least partially into said adjacent gap. In the preferred embodiment, each envelope portion is integral within said gaps with like envelope portions of adjacent shanks to define a generally V-shaped angle directed inwardly toward the opposite envelope portion. Also, in the preferred embodiment, adjacent envelope portions on one side of the shanks are spaced from the corresponding portions on the other side of the shanks within the gaps.

The envelopes provide a carrier means securing the plurality of fasteners together to form a completed fastener strip. Because of the angled juncture between the envelopes, the uniform thickness of the envelopes, and the adhesion of the portions of the envelope to a substantial fraction of the periphery of the shank, the carrier shears cleanly along its angled portion within the gaps when a fastener is driven by a driving tool. The envelope material is adhered about the driven fastener and all the carrier material is in contact with the nail shank and remains with it so that no excess carrier material is left to cause jamming and safety problems. Such construction not only insures the necessary strength so that the individual envelope penetrates the work with the driven nail, but also imparts a corrugated configuration to the carrier which insures strength and flexibility for the strip as a whole.

BRIEF DESCRIPTION OF THE SEVERAL VIEWS OF DRAWINGS

FIG. 1 is a perspective view of a fastener strip constructed according to the invention;

FIG. 2 is an enlarged sectional view taken along line 2—2 of FIG. 1;

FIG. 3 is an enlarged sectional view showing one of the nails of the strip of FIGS. 1 and 2 as it appears after being driven into a workpiece;

FIG. 4 is another embodiment of the invention in which the nails are formed so that the shanks of adjacent nails abut each other;

FIG. 5 is a further embodiment similar to FIG. 4 in which the nails have flat portions;

FIG. 6 is a still further embodiment in which the tape extends completely around the nail shanks;

FIG. 7 is a still further embodiment in which the configuration between the nail shanks has a shallow V-shaped configuration; and FIG. 8 is a still further embodiment in which the tapes between the nail shanks are notched or perforated for ease of severing.

DETAILED DESCRIPTION

While this invention is susceptible of embodiment in many different forms, there is shown in the drawings and will herein be described in detail a preferred embodiment and a number of other embodiments of the invention with the understanding that the present disclosure is to be considered as an exemplification of the principles of the invention and is not intended to limit the invention to the embodiments illustrated. The scope of the invention will be pointed out in the appended claims.

Referring first to FIG. 1, there is shown an adhered nail strip 10 suitable for use in fastener driving tools. The strip comprises a plurality of nails 11, aligned in a side-by-side flat parallel array, and having elongated cylindrical shanks 14 defining gaps 16 therebetween which are narrow as compared to the diameter of one of the shanks 14. The invention is not confined to the use of nails, but rather also comprehends the use of the other types of fasteners having elongated shanks and adapted to be driven by fastener driving tools. In any case, the gaps 16 between shanks 14 are uniform and a small fraction of the diameter of each of shanks 14.

In this embodiment, nails 11 are of the common variety with circular heads, and in order to achieve such close spacing, the heads 18 of the nails 11 have been modified by removal of one side along a chord, so that each presents the configuration of a "half-moon." Preferably, the chord sections of heads 18 are spaced slightly from, or protrude slightly beyond, the periphery of the shanks 14 on the modified side, with the amount of protrusion matching the size of gaps 16 between the shanks. The nails 11 are then arranged so that the modified heads 18 describe a stepped configuration, with a portion of the top surface of the head of one nail underlying a portion of the lower surface of the head of another nail. In constructing strip 10, loose common nails with modified heads may be arranged in the proper uniformly closely spaced manner of FIG. 1 by use of the appropriate portion of the apparatus disclosed in U.S. Pat. No. 3,878,663, which is assigned to the same assignee as the present invention.

The nails 11 are secured together in position by a carrier 20 of a metal-adherent plastic in two opposed layers enveloping substantially more than half of the periphery of the medial portion of each of shanks 14 and extending at an angle of approximately 60° to the axis of each of nails 11. Essentially, all of the carrier material is in contact with the nail shanks. In thickness, carrier 20 is substantially uniform and is a fraction of the diameter of shanks 14. As best seen in FIG. 2, the width of the gaps 16 between the shanks is related to the thickness of a layer of the carrier 20 so that this width is approximately twice the thickness of a layer of carrier 20. The particular plastic material used in the illustrative embodiment is ethylenepropylene acid terpolymer, which is especially useful and economical with steel nails and fasteners; however, other plastic materials having similar metal-adherent qualities could also be used.

Of overriding importance is the fact that the metal adherent quality of the plastic being used be such that the adhesion and cohesion properties thereof relative to the nail shank surface be greater than the shear strength necessary to shear the plastic itself and thus sever the nails from each other during firing. Furthermore, not only will the carrier shear between the nails and not from around the shanks during the firing, but the plastic carrier will not separate from the shanks as they enter the workpiece, which prevents clogging of the tool and the scattering of debris around the surrounding area.

In a preferred form, a layer of carrier 20 may be formed about a plurality of nails arrayed as just described by applying to the heated nails a tape having a thickness that is substantially half the width of gap 16 (typically a thickness of 0.006–0.020 inch of the aforementioned terpolymer material). The tape is applied in opposed relationship to both the top and the bottom sides of the horizontally arrayed nails to lie across the tangents of the shanks thereof. Since the tape is thermoplastic, the nails 11 and tape are heated (to between about 400°F. and 600°F.) and formed so that the tape layer 27 on the upper side of the array of nails 11 is urged into contact with a substantial fraction of the adjacent top one-half of the circumference or periphery of the nail shanks. Likewise, the tape layer 28 on the opposite side of the array is formed about a substantial fraction of its adjacent bottom one-half of the periphery of the adjacent nail shanks. Furthermore, both tapes 27 and 28 are also positively urged partially into gaps 16 between the nail shanks to define respectively a lower, generally V-shaped fold 29, and an upper generally V-shaped fold 31 within each of gaps 16. Upper fold 31 and lower fold 29 both extend generally inwardly in opposed relationship and are spaced from each other within each of gaps 16. The aforementioned U.S. Pat. No. 3,878,663 discloses a particularly advantageous form of an apparatus and method utilizing such tape to construct the nail strip. While there is illustrated a single relatively wide strip of tape extending across the nail shanks, two spaced relatively narrow strips could be used on each side of the strip if desired.

When the completed nail strip is utilized in a fastener driving tool, and one of the nails 11 of the strip is driven into a workpiece 25, as is shown in FIG. 3, the carrier material associated with the driven nail shears very cleanly from its adjacent neighbor because of the rather sharp V-shaped folds 29 and 31 in each of the gaps 16, as well as because all the material of carrier 20 is allocatable to the periphery of the adjacent one or the other of the shanks 14. In effect this construction provides each of the shanks 14 with an individual plastic envelope about a substantial fraction of the medial portion of each of shanks 14 which stays with the nail upon shearing, so that the carrier behaves as a collection of separate envelopes in use.

Such typical envelopes are denominated as 21, 22, and 23 in FIGS. 1 and 2, and are comprised of an upper portion 33 and a lower portion 34 adhering respectively to the opposed upper and lower sides or sections of the shanks and extending well into the two gaps adjacent the associated shanks. Each of the upper envelope portions 33, as well as each of the lower envelope portions 34, is integral, within gaps 16, with like envelope portions adhering to adjacent ones of shanks 14, to comprise respectively upper tape layer 27, and a lower tape layer 28. The inward extension of such adjacent envelope portions into gaps 16 together defines a generally V-shaped angle directed inwardly toward the opposed envelope portions, but spaced therefrom, as has been described. The material between shanks within gaps 16 associated with each of the adjacent shanks is limited and in maximum contact with the shanks because of the relationship between the width of the gaps and the thickness of the envelope and the V-shaped folds.

Thus, increased shear strength between the carrier material and the nail shanks is guaranteed, and at the same time the shear strength between the material within the gaps of opposite legs of the V-shaped folds is limited relative thereto. Therefore, the carrier shears at a predetermined position, i.e., at the apex of the V-fold, in a clean manner, and each envelope remains firmly adherent to the shank of the nail upon full penetration into the work 25 (FIG. 3). The result is a considerable improvement in the strength and uniformity of the holding power of the nail in the work, as well as the elimination of annoying accumulations under the heads of driven nails.

Referring now to other embodiments of the invention, there is illustrated in FIG. 4 an arrangement whereby the nail shanks 50 are juxtaposed into abutting relationship with each other wherein there is no clearance provided therebetween. The tapes 20 disposed on opposite sides of the shank contact a substantial portion thereof and when they are affixed into position they are directed into a generally V-shaped arrangement between the adjacent shanks.

The embodiment shown in FIG. 5 is similar to that illustrated in FIG. 4, except that the nail shanks 52 have generally flattened portions.

Referring now to the embodiment illustrated in FIG. 6, the tapes 20 disposed on opposite sides of the shanks 54 completely surround the shanks with the V-shaped portions of the tape located between the adjacent shanks abutting each other, as indicated at 56. Thus, when the nail is severed from the strip, that portion of the shank covered by the tape is completely enveloped by the tape material. In the embodiments shown in FIGS. 4, 5, and 6, the tape has a generally uniform thickness.

Referring now to FIG. 7, there is shown an arrangement whereby the nail shanks 58 are spaced apart by gaps 16 on the same order of magnitude as the nail strip illustrated in FIG. 2. However, in this embodiment, during application of the tape to the nails, the tape between the nail shanks is stretched wherein the thickness thereof indicated at 60 is less than the thickness of the tape 20 in contact with the nail shanks. This thinning is created by heat and pressure when the tape is applied to form the nail strip. In this way, a breaking section is provided which facilitates severing of the individual nails from the strip.

In FIG. 8, there is described still another way for facilitating severance of the individual nails from the strip. In this embodiment, the tape 20 has a generally uniform thickness throughout, but in the spaces or gaps 16 between the nail shanks 62 the tape is perforated or notched at 64 to permit easy separation of the individual nails from the strip.

The disclosed arrangements have proved to have superior strength in resisting disintegration of the carrier 20 both upon separation of an individual one of the nails from the remainder of strip 10, as well as in its manner of penetration into the workpiece. At the same time, the nails in the balance of the nail strip remain in their proper angular relationship. Further, no excess material is left on the strip portion which remains within the gun, or within the driving mechanism, to pose the threat of jamming, nor is any excess material propelled away from the work to create a possible safety hazard. The corrugated form of such a strip arrangement imparts added strength and flexibility to the nail strip as a unit to provide improved resistance to fracture and distortion in case of abuse. Yet, as noted above, the nail strip can be manufactured in a straightforward manner using plastic tape without presenting many of the assembly problems normally found with less advantageous prior nail strips.

What is claimed is:

1. A strip of fasteners for use in a rapid-acting fastener driving apparatus, comprising: a plurality of metal fasteners having elongated cylindrical shanks disposed in close generally parallel relationship to define a gap between adjacent shanks, and carrier means for connecting said fasteners to form said strip, said carrier means including a plurality of single-component, metal-adherent plastic envelopes extending about a major portion of each half of said shanks and having the properties of an adhesive bond without requiring a separate adhesive, each of said envelopes being of uniform thickness and having a pair of opposed portions each adhering respectively to opposite sections of the circumference of each shank during the entire driving action including entry into the workpiece, the carrier means between said envelopes extending into said adjacent gaps and defining therein between the envelope portions adhered to adjacent shanks recessed portions directed inwardly toward similar recessed portions between envelope portions secured to the opposite portions of the shanks, the bonding properties of the carrier means being such that the resistance to shear at the interface between the carrier and shank is greater than the shear resistance of the carrier material in the gap between two adjacent fasteners and greater than the resistance of the workpiece encountered when the fastener and carrier material penetrate same, thereby securing said fasteners together into said fastener strip while permitting each respective envelope and fastener to be easily and cleanly sheared and driven into said workpiece.

2. A strip of fasteners as in claim 1, wherein the recessed portions are generally V-shaped.

3. A strip of fasteners as in claim 2, wherein said V-shaped portions on opposite sides of the nail shanks are spaced from each other.

4. A strip of fasteners as in claim 1, wherein the width of said gaps is substantially twice the thickness of said envelopes.

5. A strip of fasteners as in claim 1, wherein said metal-adherent plastic is an ethylene-propylene terpolymer.

6. A strip of fasteners as in claim 1 in which the oppositely disposed plastic envelopes contact substantially one half of the circumference of the shanks and are in abutting relationship with each other between the shanks.

7. A strip of fasteners as in claim 1 in which the portions of the carrier means between the adjacent nail shanks are thinner than the plastic engaging the nail shanks to facilitate severing of the nails from the strip.

8. A strip of fasteners as in claim 1 in which the portions of the carrier means between the nail shanks are provided with perforations to facilitate separation of the nails from the strip.

9. A strip of fasteners for use in a rapid-acting fastener driving apparatus, comprising: a plurality of metal fasteners having elongated cylindrical shanks disposed in close generally parallel relationship, and carrier means for connecting said fasteners to form said strip, said carrier means including a plurality of single-component, metal-adherent plastic envelopes extending about a major portion of each half of said shanks and having the properties of an adhesive bond without requiring a separate adhesive, each of said envelopes being of uniform thickness and having a pair of opposed portions each adhering respectively to opposite sections of the circumference of each shank during the entire driving action including entry into the workpiece, the carrier means between said envelopes defining therein between the envelope portions adhered to adjacent shanks recessed portions directed inwardly toward similar recessed portions between envelope portions secured to the opposite portions of the shanks, the low and high temperature impact strength of the carrier and the adhesion properties of the carrier means to the metal fasteners and the cohesion properties of the carrier being such that the resistance to shear at the interface between the carrier and shank is greater than the shear resistance of the carrier material between two adjacent fasteners and greater than the resistance of lumber encountered when fastener and carrier material penetrate same, thereby securing said fasteners together into said fastener strip while permitting each respective envelope and fastener to be easily and cleanly sheared and driven into said lumber under the full range of temperatures at which the fasteners are being used.

10. A strip of nails for use in a rapid-acting fastener driving apparatus, comprising: a plurality of nails having elongated cylindrical shanks disposed in close generally parallel slightly spaced apart side-by-side relationship to define a narrow gap between each of the adjacent shanks, each of said nails being provided with an enlarged head having a chord section slightly spaced from the periphery of the corresponding shank by an amount matching said narrow gap, said nails being arranged with said heads overlapping in a stepped relationship; and carrier means for connecting said nails to form said strip, said carrier means including a plurality of single-component, metal-adherent plastic envelopes extending about a major portion of each half of said shanks and of the same thickness at all points and having the properties of an adhesive bond without requiring a separate adhesive, each of said envelopes having opposed portions extending between adjacent ones of said gaps over opposite sections of the periphery of said shanks, each of said envelope portions being integral with adjacent envelope portions within said gap and forming with said adjacent portions an inwardly directed, generally V-shaped angle, with the width of said gap being substantially twice the thickness of said envelopes, said adjacent envelope portions being spaced from said opposed envelope portions within said gaps, the low and high temperature impact strength of the carrier and the bonding properties of the carrier means being such that the resistance to shear at the interface between the carrier and shank is greater than the shear resistance of the carrier material between two adjacent fasteners and greater than the resistance of lumber encountered when fastener and carrier material penetrate same, thereby securing said fasteners together into said fastener strip while permitting each respective envelope and fastener to be easily and cleanly sheared and driven into said lumber under the full range of temperatures at which the fasteners are being used.

* * * * *